(No Model.)

G. WESTINGHOUSE, Jr.
UNDERGROUND CONDUCTOR FOR ELECTRIC RAILWAYS.

No. 556,602. Patented Mar. 17, 1896.

UNITED STATES PATENT OFFICE.

GEORGE WESTINGHOUSE, JR., OF PITTSBURG, PENNSYLVANIA.

UNDERGROUND CONDUCTOR FOR ELECTRIC RAILWAYS.

SPECIFICATION forming part of Letters Patent No. 556,602, dated March 17, 1896.

Application filed January 6, 1894. Serial No. 495,939. (No model.)

*To all whom it may concern:*

Be it known that I, GEORGE WESTINGHOUSE, Jr., a citizen of the United States, residing at Pittsburg, in the county of Allegheny and State of Pennsylvania, have invented a new and useful Improvement in Underground Conductors for Electric Railways, (Case No. 565,) of which the following is a specification.

My invention relates to improvements in underground systems for electrical distribution for trolley-railways where either alternating or direct current is employed for driving the cars.

The object of my invention is the provision of a novel form of conductor for contact with the trolleys, such conductor being adapted to be quickly and easily laid, to be easily insulated, to be kept automatically free from dirt, and to be fastened in place without increase of resistance.

My invention is illustrated in the accompanying drawings, in which—

Figure 1:
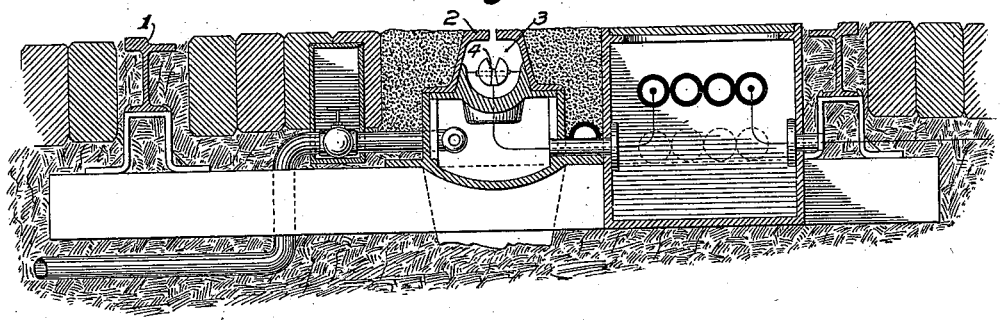
Figure 2:
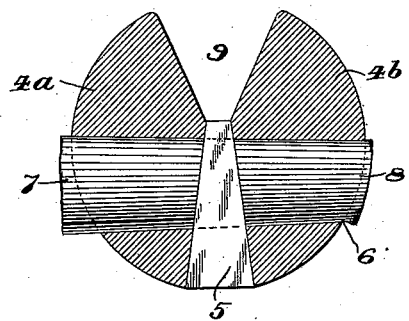
Figure 3:

Figure 1 is a cross-section for a road-bed provided with my invention and of the general type set forth and claimed in my Patent No. 497,394, granted May 16, 1893. Fig. 2 is a cross-section of my conductor at a fastening-point, the distance-piece and securing-rivet being shown in side elevation; and Fig. 3 is a plan view of my conductor, showing the arrangement of securing-pieces with relation to the joints thereof.

My conductor is adapted for use either with an overhead or underground trolley; but as its advantages are peculiarly useful in underground systems I have illustrated it in that connection in the drawings herewith.

In Fig. 1 the car-rails are shown at 1, and between them at 2 is shown a slot through which any approved form of trolley is adapted to project into the conduit 3, which is preferably of the construction set forth in my above-named patent.

At 4 is shown my improved conductor, the details of which are better set forth in Fig. 2. In this latter figure the conductor is clearly shown to consist of two halves $4^a$ and $4^b$, so arranged with relation to each other as to be separated by a double V-shaped space, the upper and lower halves of which are empty, save at points of fastening, where a wedge 5 is made to fill the lower V-shaped space for the purpose of preserving the proper relative positions of the parts. At these fastening-points an aperture 6 is provided passing through both halves $4^a$ and $4^b$, as also through the wedge 5, as shown in dotted lines. These holes are preferably carefully bored out to correspond as exactly as possible before the conductor is laid in place, and after it is so laid a reamer is preferably employed for the purpose of completing the accuracy of the fit and of imparting a slight taper, which is exaggerated in Fig. 2. The rivet 7 is thus driven through the two halves of the conductor 4, and then through the wedge between them in the manner shown in Fig. 2, the smaller end of the rivet being more or less upset, as shown at 8. The number of rivets used is of course a matter of judgment; but they should be so proportioned and such a number of them should be used that the total conductivity of the rivets should equal the combined conductivity of the parts $4^a$ and $4^b$. For this purpose the rivets are preferably made of copper.

Of course the form of fastening shown in Fig. 2 is merely a preferable one, and other forms will readily occur to the mind of the skilled mechanic, which would not involve a departure from my invention.

I prefer to lay the parts of my conductor as shown in Fig. 3, wherein the joint between the part $4^b$ occurs midway between the joint in the part $4^a$, and each half-length of one of the parts 4 is provided with three symmetrically-placed rivets or fastenings 7. This will bring two such rivets close together at joints for further security in those positions.

The conductors may be laid in any convenient lengths, and I have found twenty-foot lengths convenient in this connection.

My conductors are supported and insulated at such supports in any well-known manner, but preferably in the way indicated in my above-named patent.

In order to avoid leakage, I prefer to thoroughly insulate the whole length of my conductors, and for this purpose tar will be found a useful material. I do not limit myself to this substance in use, however.

In laying and insulating my conductor I preferably coat the whole of both sections of conductor $4^a$ and $4^b$ with the insulating material, such as tar, preferably by dipping the same in the material while in a melted condition. The sections having been laid in the conduit and fastened together in this condition, a scraper is run through the upper V-shaped space 9 in such a manner as to clear the sides of this space of all adhering insulation in order that the trolley-shoe may make proper contact with the conductor.

These conductors are of course adapted for use either laid continuously or in electrically-divided sections of any desired length, say a thousand feet. In the latter case of course feeders will be used for each section.

The particular form of half-conductors shown in Fig. 2 is not essential to my invention, although I find it convenient in connection particularly with my improved insulators. It is, however, essential to the broad idea of my invention that there should be a space 9, preferably V-shaped, between the two sections of the conductor, and it is essential to the more specific view of my invention that the second space, preferably V-shaped, should communicate below the conductors with the before-named space 9. The object of this continuous space all the way through between the parts of the conductor is to permit the falling through of any mud or other dirt which may accidentally reach the conductor from the street above. This free space also makes it easy to clean the conductor at all times.

The material of which my conductor is composed is not, of course, essential. I may state, however, that I find iron the best material on account of its cheapness, and as its cross-section is considerable in the form I employ its conductivity will be entirely sufficient.

It will, of course, be understood that my improved conductor is adapted for use with various forms of trolley which may be made to project through the slot 2 into a conduit 4 as well as with those trolleys used above on the side of the car and not adapted to enter a conduit.

What I claim is—

1. A conductor for electric railways composed of two like halves fastened together by means of conducting devices and having adjacent contact-faces separated by a clear space.

2. A conductor for electric railways composed of two like halves fastened together side by side by means of conducting devices, and separated by a clear space the upper portion of which is of V shape.

3. A conductor for electric railways composed of two halves fastened side by side and separated by two V-shaped spaces communicating at their narrow ends.

4. In a conductor for electric railways, the two conductor-halves placed side by side and separated at intervals by a wedge and providing an open space between them at one side for receiving the trolley-shoe.

5. The two conductor-halves placed side by side in sections, said sections breaking joints in combination with separating-wedges placed at intervals and fastening devices passing through said conducting parts and said wedges.

In testimony whereof I have hereunto subscribed my name this 3d day of January, A. D. 1894.

GEO. WESTINGHOUSE, JR.

Witnesses:
WM. G. WATT,
HAROLD MACKAYE.